(12) United States Patent
Kawasaki

(10) Patent No.: US 7,006,916 B2
(45) Date of Patent: Feb. 28, 2006

(54) NAVIGATION APPARATUS

(75) Inventor: Hiroshi Kawasaki, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/441,081

(22) Filed: May 20, 2003

(65) Prior Publication Data

US 2003/0220736 A1   Nov. 27, 2003

(30) Foreign Application Priority Data

May 23, 2002   (JP)   ............... 2002-149255

(51) Int. Cl.
*G01C 21/00*   (2006.01)

(52) U.S. Cl. .............. 701/211; 701/206; 701/207; 701/208; 340/995.1; 340/995.14; 340/995.15; 340/995.19; 340/995.24

(58) Field of Classification Search ............... 701/206, 701/207, 208, 211; 340/995.1, 995.14, 995.15, 340/995.19, 995.24
See application file for complete search history.

(56) References Cited

U.S. PATENT DOCUMENTS

| | | | |
|---|---|---|---|
| 5,396,431 A * | 3/1995 | Shimizu et al. | ............. 701/213 |
| 6,182,010 B1 * | 1/2001 | Berstis | ............. 701/211 |
| 6,285,317 B1 * | 9/2001 | Ong | ............. 342/357.13 |
| 6,351,710 B1 * | 2/2002 | Mays | ............. 701/211 |
| 6,385,534 B1 | 5/2002 | Yoshimura et al. | |
| 6,470,265 B1 * | 10/2002 | Tanaka | ............. 701/208 |
| 6,477,526 B1 * | 11/2002 | Hayashi et al. | ............. 707/4 |
| 2002/0013658 A1 * | 1/2002 | Tanaka et al. | ............. 701/209 |

FOREIGN PATENT DOCUMENTS

| | | |
|---|---|---|
| CN | 1155819 A | 7/1997 |
| CN | 1305583 A | 7/2001 |
| EP | 1069547 A1 * | 1/2001 |
| JP | A 5-113343 | 5/1993 |
| JP | 8-4759 | 1/1996 |
| JP | 2002/139327 A | 5/2002 |
| WO | 1999/66290 A1 | 12/1999 |

* cited by examiner

*Primary Examiner*—Michael J. Zanelli
*Assistant Examiner*—Eric M. Gibson
(74) *Attorney, Agent, or Firm*—Oliff & Berridge, PLC

(57) ABSTRACT

The navigation apparatus includes a unit for displaying a real image on a display screen on the basis of real image data, and a unit for displaying additional information such as a primary place name or a primary building name in a position where the additional information should be displayed on the real image, on the basis of additional information data corresponding to the additional information and position data showing the position where the additional information should be displayed. Further, the navigation apparatus has a function of limiting the display area of the additional information so as to prevent the additional information from being displayed in an area having a relatively high level of importance. Thus, the real image is prevented from being difficult to see in the area having a high level of importance.

12 Claims, 8 Drawing Sheets

| COORDINATES | CATEGORY | CHARACTER CODE |
|---|---|---|
| $x_1, y_1$ | GAS STATION | XX OIL |
| $x_2, y_2$ | CONVENIENCE STORE | XX STORE |
| $x_3, y_3$ | BANK | XX BANK |
| $x_4, y_4$ | SCHOOL | XX ELEMENTARY SCHOOL |
| $x_5, y_5$ | PLACE NAME | KOBE |
| $x_6, y_6$ | STATION NAME | KOBE STATION |

NAVIGATION APPARATUS

The present disclosure relates to the subject matter contained in Japanese Patent Application No. 2002-149255 filed on May 23, 2002, which is incorporated herein by reference in its entirety.

BACKGROUND OF THE INVENTION

1. Field of the Invention

The present invention relates to navigation apparatus, and particularly relates to navigation apparatus using real image data corresponding to an image such as a satellite photograph or an aerial photograph showing the surface of the earth.

2. Description of the Related Art

A navigation apparatus in the related art can display a map on a screen of a display unit on the basis of map data recorded in a DVD-ROM or the like, or can further display the position of the navigation apparatus itself on the map on the basis of position data of its own, so as to navigate a user along a route for a destination.

However, in the navigation apparatus in the related art, the map screen to be displayed is made up from the map data used. Accordingly, there is a problem that it is difficult for the user to catch the current position of the navigation apparatus itself on the map screen or to grasp the real conditions in the periphery of the current position of the navigation apparatus itself.

This is because it is difficult to express the vertical position relationship between roads solidly crossing with each other on the map screen, and in fact there are many roads and buildings not displayed on the map screen.

As one of solutions to such a problem, there has been disclosed an invention in which the current position of the apparatus itself is displayed on an aerial photograph screen made up from aerial photograph data (JP-A-5-113343). With such an aerial photograph screen, it becomes very easy to find a building or the like as a landmark. Thus, it becomes easy to catch the current position of the apparatus itself. In addition, there is an advantage that it can be also made easy to grasp the real conditions of the periphery of the current position of the apparatus itself.

However, by merely displaying an aerial photograph screen in JP-A-5-113343, it is impossible to attain navigation apparatus satisfying a user sufficiently.

For example, the navigation apparatus in the related art is provided with a function of displaying character information of primary place names, building names, or the like, as additional information over the real image on the map screen. It is expected that the character information will be also displayed over the real image such as an aerial photograph in the future.

However, when the character information is displayed over the real image such as an aerial photograph in the same manner as in the related art, there is a fear that it becomes difficult to see the real image (in addition, there is also a fear that the character information becomes inconspicuous). Conceivably, this is because the real image is an aerial photograph or the like showing the real surface of the earth so that the real image may include a place not suitable for displaying the character information or the like over there.

SUMMARY OF THE INVENTION

The invention is developed in consideration of the problem. It is an object of the invention to provide navigation apparatus designed variously to enhance the satisfaction level of a user, and having a function of displaying a real image such as a satellite photograph or an aerial photograph showing the surface of the earth.

In order to achieve the object, according to a first aspect of the invention, a navigation apparatus includes a display screen, a first display control unit, and a second display control unit. The first display control unit makes the display screen display a real image, based on real image data formed to be able to associate with positional coordinates. The second display control unit displays additional information over the real image display on the display screen, based on additional information data corresponding to additional information and position data indicating a position where the additional information should be displayed. The second display control unit displays the additional information within a limited displayed area on the real image displayed on the display screen.

According to a second aspect of the invention, in the first aspect, when the first display control unit displays the real image showing neighborhood of a current position of the navigation apparatus on the display screen based on position information indicating the current position of the navigation apparatus, the limited displayed area does not include periphery of the current position of the navigation apparatus.

In the first and second aspect, character information such as a primary place name or a primary building name is displayed as the additional information on the real image (for example, a satellite photograph or an aerial photograph). Thus, a user can find the primary place or the primary building easily due to the additional information.

As described in the section "Background of the Invention", when the additional information is displayed over the real image, there is a fear that it becomes difficult to see the real image. However, in the first and second aspect, the additional information is displayed within a limited display area on the real image. Accordingly, for example, it is possible to prevent the additional information from being displayed in an area (for example, in the neighborhood of the apparatus itself) in which the real image should be prevented from being difficult to see.

Thus, even if the additional information is displayed over the real image, the real image can be prevented from being difficult to see in an area having a relatively high level of importance, for example, in the neighborhood of the apparatus itself. As a result, it is possible to realize navigation apparatus having a very good perspective.

According to a third aspect of the invention, a navigation apparatus includes a display screen, a first display control unit, and a second display control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. The second display unit, based on a category specified by a user and contained in the additional information and category data associated with the additional information, differentiates display of the specified category of the additional information from that of the other categories of the additional information.

In the third aspect, character information such as a primary place name or a primary building name is displayed as the additional information on the real image (for example, a satellite photograph or an aerial photograph). Thus, a user can find the primary place or the primary building easily due to the additional information.

As described in the section "Background of the Invention", when the additional information is displayed over the real image, there is a fear that the additional information becomes inconspicuous. However, in the third aspect, the display of the additional information for the category specified by the user can be differentiated from the display of the additional information not for the category. For example, the visibility of character information of facilities specified by the user can be made relatively high while the visibility of character information of facilities not specified by the user can be made relatively low.

Thus, the additional information for the category specified by the user can be made conspicuous. On the contrary, the additional information for the category not specified by the user can be made inconspicuous. In this manner, the real image can be viewed easily. Incidentally, although description was made here along the example in which the visibility of the character information of facilities not specified by the user was made relatively low, the character information of facilities not specified by the user may be made totally invisible.

According to a fourth aspect of the invention, a navigation apparatus includes a display screen, a first display control unit, and a second display control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. The second display control unit selects a display form of the additional information based on a condition that the real image is displayed at or near the position where the additional information should be displayed, and displaying the additional information on the real image in the selected display form.

According to a fifth aspect of the invention, in the fourth aspect, the condition that the real image is displayed is a color tone of the real image.

In the fourth and fifth aspects, character information such as a primary place name or a primary building name is displayed as the additional information on the real image (for example, a satellite photograph or an aerial photograph). Thus, a user can find the primary place or the primary building easily due to the additional information.

As described repeatedly previously, when the additional information is displayed over the real image, there is a fear that the additional information becomes inconspicuous. However, in the fourth and fifth aspects, the display form of the additional information is selected on the basis of the condition (for example, the color tone of the rear image as the background) that the real image is displayed in or near the position where the additional information should be displayed. Then, the additional information is displayed on the real image in the selected display form. Accordingly, for example, when the real image as the background where the character information such as a place name should be display is blackish, the character information can be displayed in white. On the other hand, when the real image is whitish, the character information can be displayed in black.

Thus, even if the additional information is displayed over the real image, the additional information can be made conspicuous.

According to a sixth aspect of the invention, a navigation apparatus includes a display screen, a first display control unit, and a second display control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. The second display control unit selects a display form of the additional information based on category data associated with the additional information, and displays the additional information on the real image in the selected display form.

In the sixth aspect, character information such as a primary place name or a primary building name is displayed as the additional information on the real image (for example, a satellite photograph or an aerial photograph). Thus, a user can find the primary place or the primary building easily due to the additional information.

Further, the display form of the additional information is selected on the basis of the category data associated with the additional information. Then, the additional information is displayed on the real image in the selected display form. Accordingly, for example, in the case where the character information such as a building name is displayed, the character information can be displayed in red if the building is a bank, and the character information can be displayed in green if the building is a gas station.

Thus, even if the additional information is displayed over the real image, the additional information can be made conspicuous with the display form being changed in accordance with each category.

According to a seventh aspect of the invention, a navigation apparatus includes a display screen, a first display control unit, a second display control unit, a change specifying unit, a change content storing unit, and a storage control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. The change specifying unit allows a user to specify a change of a display form of the additional information to be displayed on the real image, for each predetermined condition associated with the additional information. The change content storing unit stores a content of the change of the display form in association with the predetermined condition. The storage control unit makes the change content storing unit store the content of the change of the display form specified by the change specifying unit. The second display control unit selects the display form of the additional information based on the content stored in the change content storing unit, and displays the additional information on the real image in the selected display form.

Further, according to an eighth aspect of the invention, in the seventh aspect, the predetermined condition associated with the addition information includes one of a condition that the real image is displayed in or near the position where the additional information should be displayed, and a category associated with the additional information.

In the seventh and eighth aspects, character information such as a primary place name or a primary building name is displayed as the additional information on the real image (for example, a satellite photograph or an aerial photograph). Thus, a user can find the primary place or the primary building easily due to the additional information.

Further, the additional information is displayed on the real image in the display form specified by the user in accordance with the predetermined condition (for example, the color tone of the real image as the background where the additional information should be displayed) associated with the additional information. Accordingly, the additional information can be displayed in the form desired by the user.

Incidentally, examples of such predetermined conditions include the condition (that is, the color tone of the real image as the background) that the real image is displayed in or near the position where the additional information should be displayed, the category associated with the additional information, and the like.

Further, according to a ninth aspect of the invention, a navigation apparatus includes a display screen, a first display control unit, and a second display control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. When the second display control unit determines that an instruction to display the additional information has been given by a user, the second display control unit displays the additional information on the real image for a predetermined period.

In the ninth aspect, character information such as a primary place name or a primary building name is displayed as the additional information on the real image (for example, a satellite photograph or an aerial photograph). Thus, a user can find the primary place or the primary building easily due to the additional information.

As described repeatedly previously, when the additional information is displayed over the real image, there is a fear that it becomes difficult to see the real image. However, in the ninth aspect, when an instruction to display the additional information is given by the user, the additional information is displayed on the real image for the predetermined period (for example, 30 seconds). Accordingly, in an ordinary time, it is possible to avoid the occurrence of the problem that the real image is made difficult to see due to the additional information.

According to a tenth aspect of the invention, a navigation apparatus includes a display screen, a first display control unit, and a second display control unit. The first display control unit makes the display screen display a real image, based on real image data formed to be able to associate with positional coordinates. The second display control unit displays additional information on the real image display on the display screen, based on additional information data corresponding to additional information and position data indicating a position where the additional information is to be displayed. When the additional information is displayed on the real image and the second display control unit determines that an instruction to erase the additional information has been given by a user, the second display control unit erases the additional information from the real image for a predetermined period.

In the tenth aspect, character information such as a primary place name or a primary building name is displayed as the additional information on the real image (for example, a satellite photograph or an aerial photograph). Thus, a user can find the primary place or the primary building easily due to the additional information.

Further, when an instruction to erase the additional information is given by the user, the additional information is erased from the real image for the predetermined period (for example, 30 seconds). Thus, at user's desire, the additional information can be erased to make it easy to see the real image.

Further, according to an eleventh aspect of the invention, a navigation apparatus includes a display screen and a third display control unit. The display screen displays information required for reaching a destination to guide the navigation apparatus to the destination. The third display control unit displays on the display screen a real image showing peripheries of points on a guide route, from a second point to a first point along the guide route on the basis of route information and real image data. The route information relates to the guide route for the navigation apparatus to reach a first point. The real image data is formed to associate with positional coordinates. The navigation apparatus will pass through the second point before reaching the first point.

In the eleventh aspect, the real image (for example, a satellite photograph or an aerial photograph) showing the periphery of each point on the navigation route is displayed along the navigation route from the predetermined second point (for example, 500 m short of the predetermined first point) to the predetermined first point (for example, a destination or a waypoint which will be passed through before the destination). Accordingly, the traveling environment from the predetermined second point to the predetermined first point can be introduced to the user. Thus, the user can grasp the conditions or the like around the destination through the real image such as a satellite photograph in advance.

DETAILED DESCRIPTION OF THE PREFERRED EMBODIMENT

Figures 1, 2:
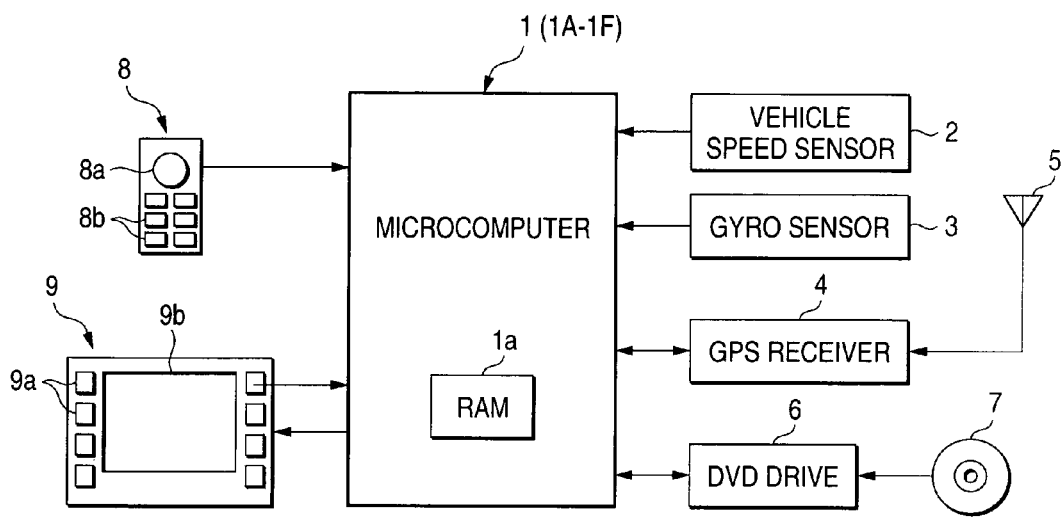
FIG. 1 is a block diagram schematically showing the main portion of navigation apparatus according to Embodiment (1) of the invention.
FIG. 2 is a table showing an example of the configuration of character data stored in a DVD-ROM 7 in the navigation apparatus according to Embodiment (1).

Embodiments of a navigation apparatus according to the invention will be described below with reference to the drawings. FIG. 1 is a block diagram schematically showing the main portion of the navigation apparatus according to Embodiment (1).

A vehicle speed sensor 2 for acquiring information about the covered distance from the vehicle speed by arithmetic operation and a gyrosensor 3 for acquiring information about the traveling direction are connected to a microcomputer 1. The microcomputer 1 can obtain the position of the vehicle on the basis of the covered distance information and the traveling direction information obtained thus (self-contained navigation).

A GPS receiver 4 receives a GPS signal from a satellite through an antenna 5. The GPS receiver 4 is connected to the microcomputer 1 so that the microcomputer 1 can obtain the position of the vehicle on the basis of the GPS signal (GPS navigation).

A DVD drive 6 is connected to the microcomputer 1 so that map data, character data for displaying characters of primary place names or building names, and real image data of satellite photographs showing the surface of the earth can be imported from a DVD-ROM 7 (possibly another storage unit) recording the map data, the character data and the real image data. The microcomputer 1 stores required pieces of the map data, the character data and the real image data into a RAM 1a in the microcomputer 1 from the DVD-ROM 7 on the basis of the obtained current position information of the vehicle, the route information about a navigation route which will be described later, and so on.

Incidentally, each piece of the character data is formed out of data of character codes indicating position coordinates, a category (for example, gas station, convenience store, bank, or the like), a building name, etc, as shown in FIG. 2. In addition, an example of the method for associating the real image data with position coordinates is a method using the left upper and right lower latitudes and longitudes of a rectangular area expressed by the real image data.

In addition, the microcomputer 1 matches the obtained current position of the vehicle with the map data (performs map matching processing) so that a map screen showing the current position of the vehicle accurately can be displayed on a display panel 9b. In addition, a switch signal output from a joystick 8a or a button switch 8b provided in a remote controller 8 or a switch signal output from a button switch 9a provided in a display unit 9 is supplied to the microcomputer 1. The microcomputer 1 performs processing in accordance with such a switch signal. For example, when the microcomputer 1 acquires information of a destination or a waypoint from these switches, the microcomputer 1 obtains an optimal route from the current position (place of departure) of the vehicle to the destination (via the waypoint), and displays the optimal route as a navigation route on the display panel 9b together with the map screen.

In addition, a plurality of infrared LEDs and a plurality of phototransistors are disposed in the upper, the lower, the left and the right of the display panel 9b so as to be opposed to each other, so that the position where a finger touches the display panel 9b can be detected. The detection result can be acquired by the microcomputer 1.

Figure 3:
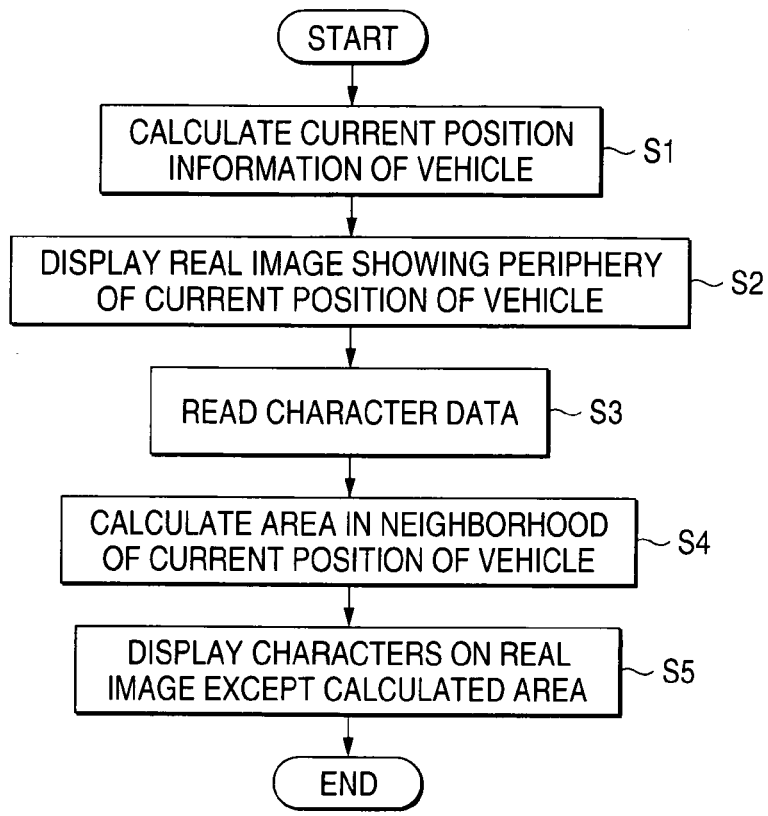
FIG. 3 is a flow chart showing a processing operation performed by a microcomputer in the navigation apparatus according to Embodiment (1).

Next, a processing operation (1) about the display of a real image performed by the microcomputer 1 in the navigation apparatus according to Embodiment (1) will be described with reference to the flow chart shown in FIG. 3. First, the current position of the vehicle is calculated from the GPS signal or the like (Step S1). A real image (for example, a satellite photograph, an aerial photograph, or the like) showing the periphery of the current position of the vehicle is displayed on the display panel 9b on the basis of the calculated current position information of the vehicle, and the real image data stored in the RAM 1a (Step S2).

Next, the character data corresponding to characters to be displayed on the real image displayed on the display panel 9b is read from the RAM 1a (Step S3). Subsequently, an area of the neighborhood of the current position of the vehicle (incidentally, the neighborhood of the current position of the vehicle means a range narrower than the periphery of the current position of the vehicle) is calculated (Step S4). The characters are displayed over the real image displayed on the display panel 9b on the basis of the character data read previously, so as not to display the character in the calculated area (that is, the neighborhood of the current position of the vehicle) (Step S5).

In the navigation apparatus according to Embodiment (1), character information such as a primary place name or a primary building name is displayed as the additional information on the real image (for-example, a satellite photograph or an aerial photograph). Thus, a user can find the primary place or the primary building easily due to the additional information.

Further, when a real image showing the periphery of the current position of the vehicle is displayed, the additional information is not displayed in the neighborhood of the current position of the vehicle (the area where the real image should be prevented from being difficult to see). It is therefore possible to realize navigation apparatus having a very good perspective.

In addition, although the description in the navigation apparatus according to Embodiment (1) is made only about the limitation of the display of the additional information in the case where a real image showing the periphery of the current position of the vehicle is displayed, the invention is not limited to such a case. For example, when a real image showing the periphery of a destination is displayed, the additional information may not be displayed in the neighborhood of the destination.

Next, description will be made about navigation apparatus according to Embodiment (2). The navigation apparatus according to Embodiment (2) has the same configuration as the navigation apparatus shown in FIG. 1, except the microcomputer 1. Thus, the microcomputer in the navigation apparatus according to Embodiment (2) is denoted by the different reference numeral, but description of the other constituent members will be omitted here.

Figure 4:
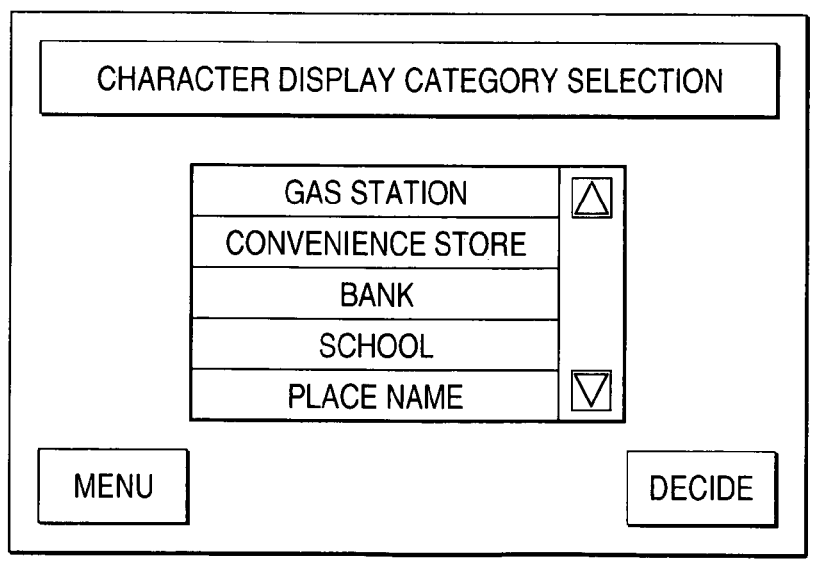
FIG. 4 is a view showing an operation screen displayed on a display panel in the navigation apparatus according to Embodiment (1).

In the navigation apparatus according to Embodiment (2), a user can perform various kinds of setting through a screen displayed on the display panel 9b. For example, categories of facilities to be displayed on a real image such as a satellite photograph can be selected through a "character display category selection" screen as shown in FIG. 4.

Figure 5:
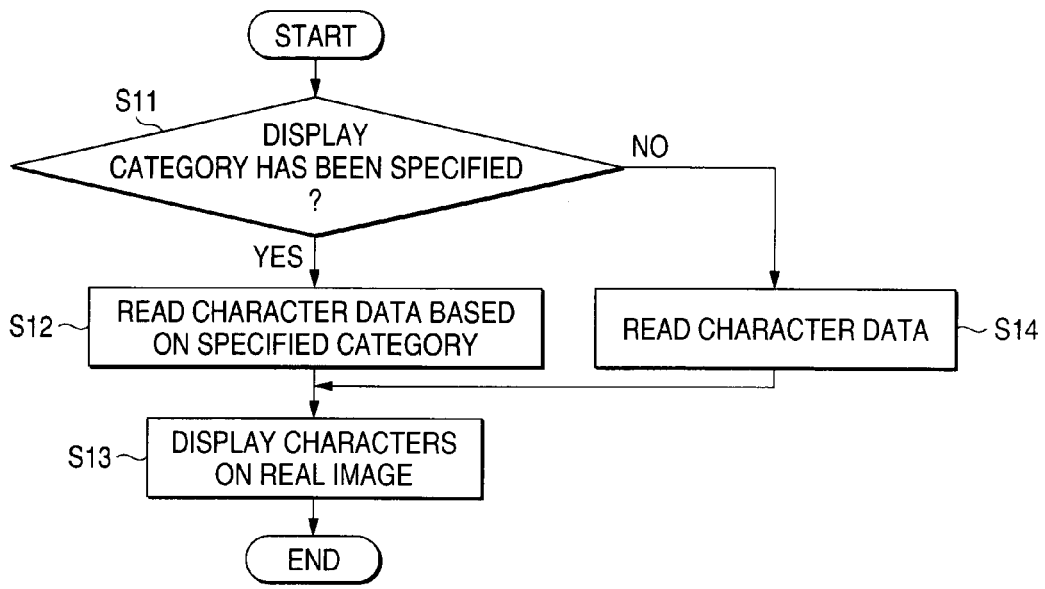
FIG. 5 is a flow chart showing a processing operation performed by a microcomputer in navigation apparatus according to Embodiment (2) of the invention.

Next, a processing operation (2) performed by a microcomputer 1A in the navigation apparatus according to Embodiment (2) will be described with reference to the flow chart shown in FIG. 5. Incidentally, the processing operation (2) is to be performed when a real image such as a satellite photograph is displayed on the display panel 9b.

First, it is judged whether a category of facilities or the like to be displayed on the real image has been specified by the user or not (Step S11) Incidentally, the judgment can be performed on the basis of whether specifying has been performed through the "character display category selection" screen (FIG. 4) by the user or not.

When it is concluded in Step S11 that specifying has been performed, of the character data corresponding to characters to be displayed on the real image displayed on the display panel 9b, the character data corresponding to the category specified by the user is read from the RAM 1a on the basis of the category data (Step S12), and characters of place names or the like are displayed over the real image on the basis of the read character data (Step S13).

On the contrary, when it is concluded that specifying has not been performed, the character data corresponding to characters to be displayed over the real image displayed on the display panel 9b is read from the RAM 1a (Step S14), and the characters are displayed over the real image on the basis of the read character data (Step S13).

In the navigation apparatus according to Embodiment (2), character information such as a primary place name or a primary building name is displayed as the additional information on the real image (for example, a satellite photograph or an aerial photograph). Thus, a user can find the primary place or the primary building easily due to the additional information.

Further, only the additional information for the category specified by the user is displayed while the additional information for any category not specified by the user (that is, characters having a low level of importance) is not displayed. It is therefore possible to prevent the real image from being difficult to see due to the additional information having a low level of importance.

The navigation apparatus according to Embodiment (2) is designed to display only the additional information for the category specified by the user and not to display the additional information for any category not specified by the user. However, in navigation apparatus according to another embodiment, the visibility of the additional information for the category specified by the user is made relatively high while the visibility of the additional information for any category not specified by the user is made relatively low. Thus, the additional information may be differentiated.

Next, description will be made about navigation apparatus according to Embodiment (3). The navigation apparatus according to Embodiment (3) has the same configuration as the navigation apparatus shown in FIG. 1, except the microcomputer 1. Thus, the microcomputer in the navigation apparatus according to Embodiment (3) is denoted by the different reference numeral, but description of the other constituent members will be omitted here.

Figure 6A:
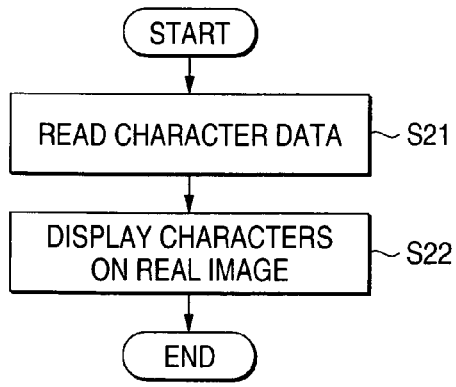
FIGS. 6A and 6B are flow charts showing a processing operation performed by a microcomputer in navigation apparatus according to Embodiment (3) of the invention.

When a real image such as a satellite photograph has been displayed on the display panel 9b, as shown in the flow chart of FIG. 6A, a microcomputer 1B in the navigation apparatus according to Embodiment (3) reads, from the RAM 1a, character data corresponding to characters to be displayed on the real image displayed on the display panel 9b (Step S21). The microcomputer 1B can display the characters over the real image on the basis of the read character data (Step S22).

Figure 7:
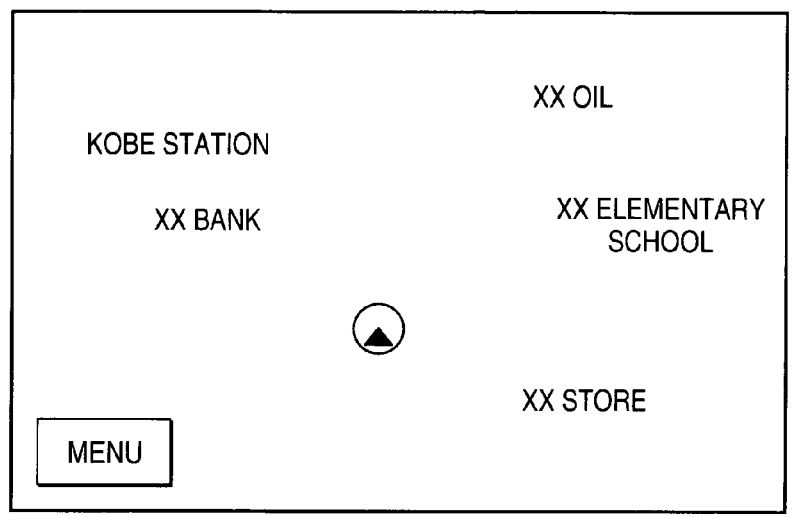
FIG. 7 is a view showing an example of a state of a screen displayed on a display panel in the navigation apparatus according to Embodiment (3).

Incidentally, when the characters are displayed over the real image, a plurality of character codes such as place names, gas station names, or school names, are displayed on the real image displayed on the display panel 9b in most cases, as shown in FIG. 7.

Figure 6B:
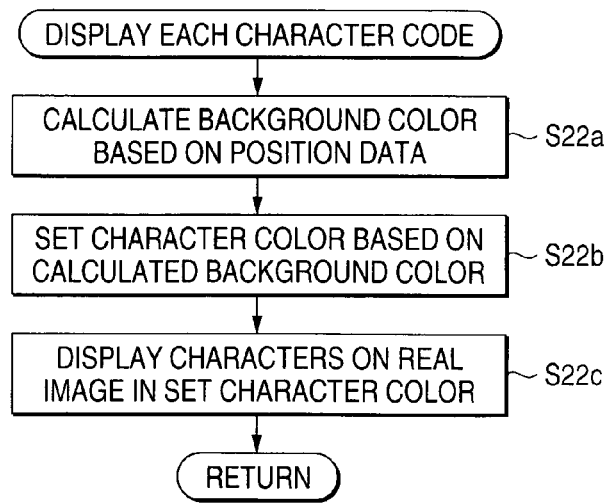

Next, a processing operation (3) performed by the microcomputer 1B in the navigation apparatus according to Embodiment (3) will be described with reference to the flow chart (for explaining the processing operation of Step S22 in more detail) shown in FIG. 6B. Incidentally, the processing operation (3) is to be performed for each character code to be displayed over the real image.

First, the color tone (that is, background color) of the real image near the position where the character code should be displayed is obtained on the basis of position coordinate data indicating the position where the character code should be displayed (Step S22a). Next, the character color of the character code is set on the basis of the obtained background color (Step S22b). For example, when the background color is blackish, the character color is set to be white. On the contrary, when the background color is whitish, the character color is set to be black. Next, the character code is displayed over the real image in the set character color (Step S22c).

In the navigation apparatus according to Embodiment (3), character information such as a primary place name or a primary building name is displayed as the additional information on the real image (for example, a satellite photograph or an aerial photograph). Thus, a user can find the primary place or the primary building easily due to the additional information.

Further, the display form of the additional information is selected on the basis of the condition (here, the color tone of the real image as the background) that the real image is displayed in or near the position where the additional information should be displayed. Then, the additional information is displayed on the real image in the selected display form. Thus, the additional information can be made conspicuous even if the additional information is displayed over the real image.

Next, description will be made about navigation apparatus according to Embodiment (4). The navigation apparatus according to Embodiment (4) has the same configuration as the navigation apparatus shown in FIG. 1, except the microcomputer 1. Thus, the microcomputer in the navigation apparatus according to Embodiment (4) is denoted by the different reference numeral, but description of the other constituent members will be omitted here.

Figure 8A:
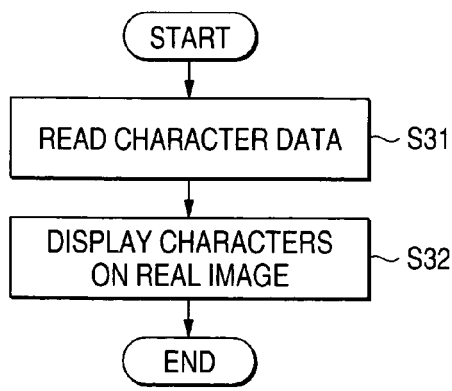
FIGS. 8A and 8B are flow charts showing a processing operation performed by a microcomputer in navigation apparatus according to Embodiment (4) of the invention.

When a real image such as a satellite photograph has been displayed on the display panel 9b, as shown in the flow chart of FIG. 8A, a microcomputer 1C in the navigation apparatus according to Embodiment (4) reads, from the RAM 1a, character data corresponding to characters to be displayed on the real image displayed on the display panel 9b (Step S31). The microcomputer 1C can display the characters over the real image on the basis of the read character data (Step S32).

Incidentally, when the characters are displayed over the real image, a plurality of character codes of place names or facility names such as gas station names or school names, are displayed on the real image displayed on the display panel 9b in most cases, as shown in FIG. 7.

Figure 8B:
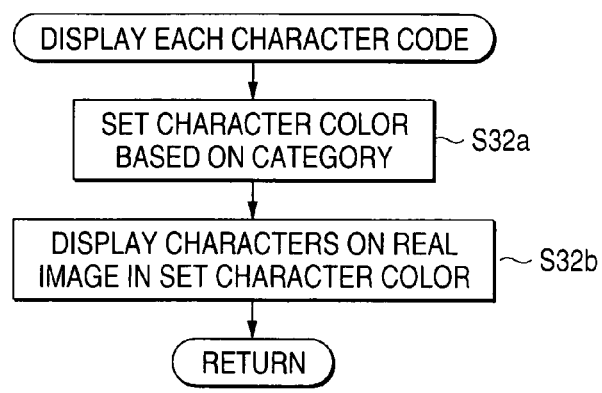

Next, a processing operation (4) performed by the microcomputer 1C in the navigation apparatus according to Embodiment (4) will be described with reference to the flow chart (for explaining the processing operation of Step S32 in more detail) shown in FIG. 8B. Incidentally, the processing operation (4) is to be performed for each character code to be displayed over the real image.

First, the character color of the character code is set on the basis of category data corresponding to the character code (Step S32a). For example, when the character code of a building name or the like is displayed, the character color will be set to be red if the building is a bank, and the character color will be set to be green if the building is a gas station. Next, the character code is displayed over the real image in the set character color (Step S32b).

In the navigation apparatus according to Embodiment (4), character information such as a primary place name or a primary building name is displayed as the additional information on the real image (for example, a satellite photograph or an aerial photograph). Thus, a user can find the primary place or the primary building easily due to the additional information.

Further, the display form of the additional information is selected on the basis of the category data associated with the additional information. Then, the additional information is displayed on the real image in the selected display form. Thus, the additional information can be made conspicuous with the display form being changed for each category even if the additional information is displayed over the real image.

In addition, in the navigation apparatus according to Embodiment (3) or (4), the description as for the change of the display form of the character code is made only in the case where the color is changed. The change of the display form is not limited to the change of the color. In navigation apparatus according to another embodiment, the font or the font size may be changed.

In addition, in navigation apparatus according to further another embodiment, the contents of the change of the display form can be specified by the user. In this case, the specified contents may be stored in a memory. Then, the display form is changed on the basis of the contents stored in the memory.

Next, description will be made about navigation apparatus according to Embodiment (5). The navigation apparatus according to Embodiment (5) has the same configuration as the navigation apparatus shown in FIG. 1, except the microcomputer 1. Thus, the microcomputer in the navigation apparatus according to Embodiment (5) is denoted by the different reference numeral, but description of the other constituent members will be omitted here.

Figure 9:
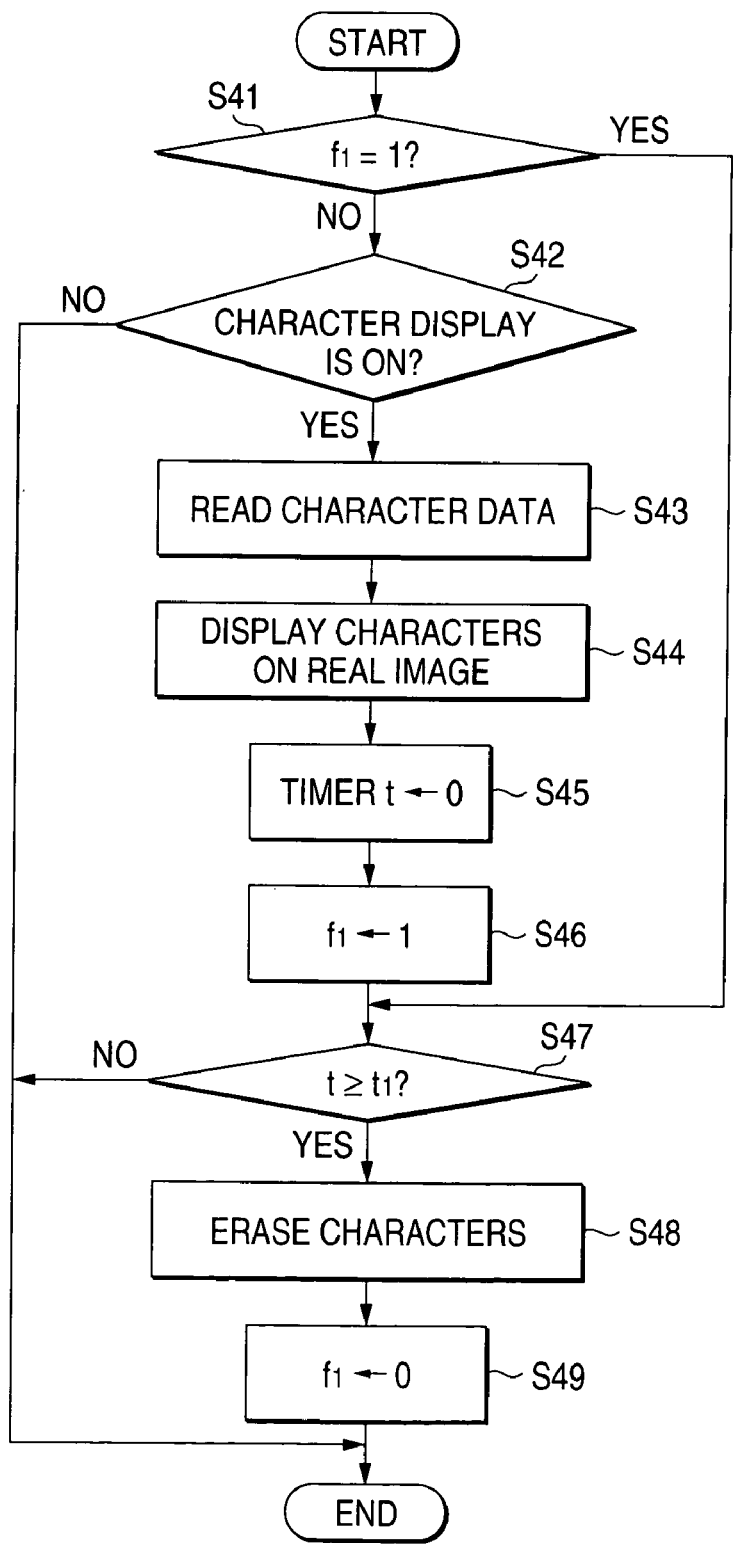
FIG. 9 is a flow chart showing a processing operation performed by a microcomputer in navigation apparatus according to Embodiment (5) of the invention.

A processing operation (5) performed by a microcomputer 1D in the navigation apparatus according to Embodiment (5) will be described with reference to the flow chart shown in FIG. 9. Incidentally, the processing operation (5) is to be performed when a real image such as a satellite photograph is displayed on the display panel 9b. In addition, when there is no instruction from the user, additional information of characters (for example, place names or building names) or the like are not displayed on the real image generally.

First, it is judged whether a flag $f_1$ indicating that characters are displayed on the real image displayed on the display panel 9b is 1 or not (Step S41). When it is concluded that the flag $f_1$ is not 1 (that is, no character is displayed), next whether an instruction to display characters is given by the user or not is judged based on the operation of the button switch 8b of the remote controller 8 or the like by the user (Step S42). Incidentally, the instruction to display characters may be issued through a touch switch or the like that can be operated by direct touch to the display panel 9b.

When it is concluded that there is an instruction to display characters from the user, character data corresponding to characters to be displayed on the real image displayed on the display panel 9b is read from the RAM 1a (Step S43), and the characters of a place name or the like are displayed over the real image on the basis of the read character data (Step S44). Next, a timer t is reset and started (Step S45), and the flag $f_1$ is set at 1 (Step S46). After that, the routine of processing advances to Step S47. On the other hand, when it is concluded that there is no instruction to display characters from the user, the processing operation (5) is terminated as it is.

In Step S47, it is judged whether the timer t has counted at least a predetermined time $t_1$ (for example, 30 seconds) or not. When it is concluded that the timer t has counted at least the predetermined time $t_1$ (that is, 30 seconds have passed since the character display was started), the characters displayed on the real image are erased (Step S48), and the flag $f_1$ is then set at 0 (Step S49). On the other hand, when it is concluded that the timer t has not counted the predetermined time $t_1$, there is no need to erase the characters, and the processing operation (5) is terminated as it is.

On the other hand, it is concluded in Step S41 that the flag $f_1$ is 1 (that is, the characters have been displayed on the real image displayed on the display panel 9b), the routine of processing skips over Steps S42 to S46 and jumps to Step S47, judging whether the predetermined time $t_1$ has passed or not since the character display was started.

In the navigation apparatus according to Embodiment (5), character information such as a primary place name or a primary building name is displayed as the additional information on the real image (for example, a satellite photograph or an aerial photograph). Thus, a user can find the primary place or the primary building easily due to the additional information.

In addition, when there is an instruction to display the additional information from the user, the additional information is displayed on the real image for the predetermined time $t_1$. Accordingly, in an ordinary time, it is possible to avoid the occurrence of such a problem that the real image is made difficult to see due to the additional information.

Next, description will be made about navigation apparatus according to Embodiment (6). The navigation apparatus according to Embodiment (6) has the same configuration as the navigation apparatus shown in FIG. 1, except the microcomputer 1. Thus, the microcomputer in the navigation apparatus according to Embodiment (6) is denoted by the different reference numeral, but description of the other constituent members will be omitted here.

Figure 10:
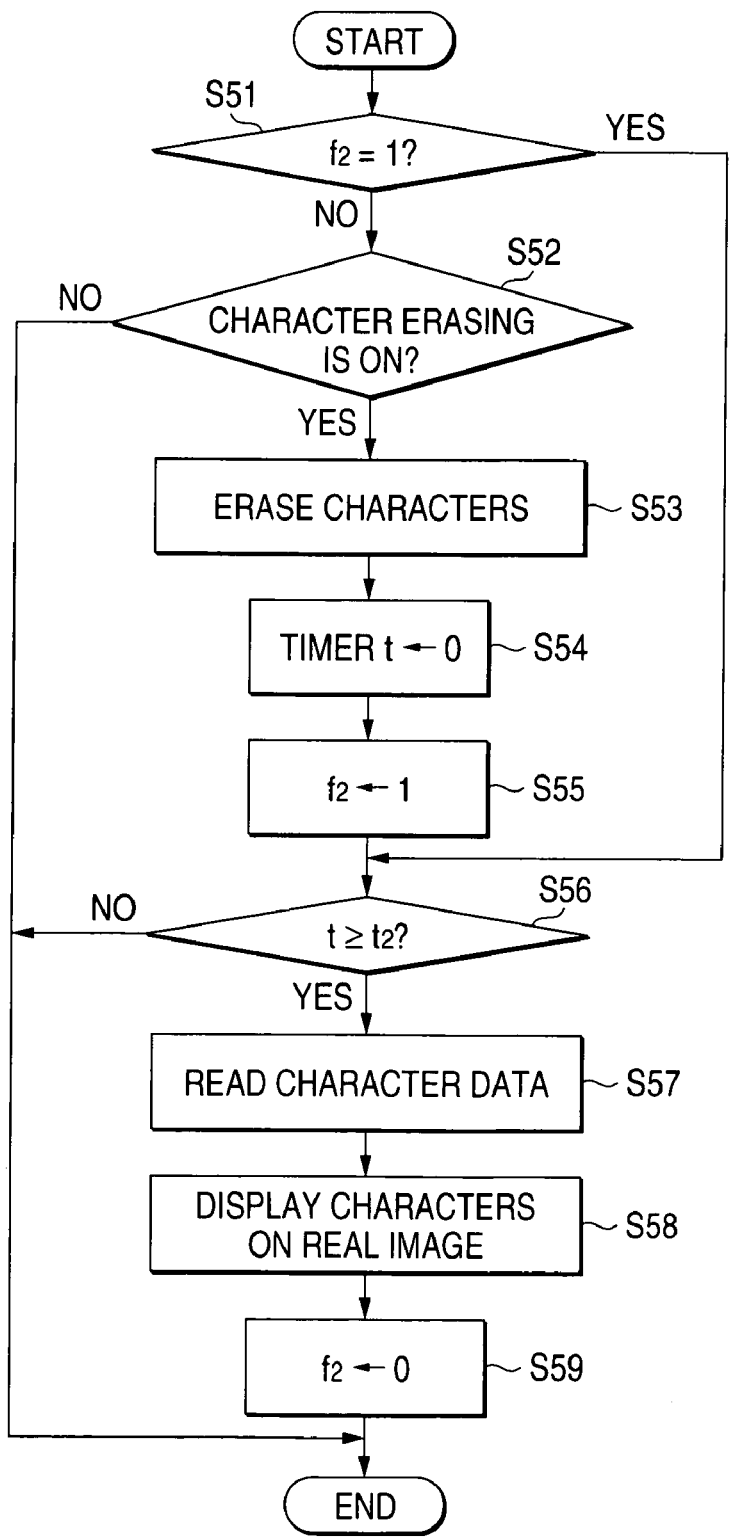
FIG. 10 is a flow chart showing a processing operation performed by a microcomputer in navigation apparatus according to Embodiment (6) of the invention.

A processing operation (6) performed by a microcomputer 1E in the navigation apparatus according to Embodiment (6) will be described with reference to the flow chart shown in FIG. 10. Incidentally, the processing operation (6) is to be performed when a real image such as a satellite photograph has been displayed on the display panel 9b. In addition, when there is no instruction from the user, additional information of characters (for example, place names or building names) or the like are not displayed on the real image.

First, it is judged whether a flag $f_2$ indicating that no character has been displayed on the real image displayed on the display panel 9b is 1 or not (Step S51). When it is concluded that the flag $f_2$ is not 1 (that is, characters have been displayed), next whether an instruction to erase the characters has been given by the user or not is judged based on the operation of the button switch 8b of the remote controller 8 or the like by the user (Step S52). Incidentally, the instruction to erase the characters may be issued through a touch switch or the like that can be operated by direct touch to the display panel 9b.

When it is concluded that there is the instruction to erase the characters from the user, the characters displayed on the real image are erased (Step S53). Next, a timer t is reset and started (Step S54), and the flag $f_2$ is set at 1 (Step S55). After that, the routine of processing advances to Step S56. On the other hand, when it is concluded that there is no instruction to erase the characters from the user, the processing operation (6) is terminated as it is.

In Step S56, it is judged whether the timer t has counted at least a predetermined time $t_2$ (for example, 30 seconds) or not. When it is concluded that the timer t has counted at least the predetermined time $t_2$ (that is, 30 seconds have passed since the characters were erased), the character data corresponding to characters to be displayed on the real image displayed on the display panel 9b is read from the RAM 1a (Step S57), and the characters of a place name or the like are displayed over the real image on the basis of the read character data (Step S58). Then, the flag $f_2$ is set at 0 (Step S59). On the other hand, when it is concluded that the timer t has not counted the predetermined time $t_2$, the characters do not have to be displayed, and the processing operation (6) is terminated as it is.

On the other hand, it is concluded in Step S51 that the flag $f_2$ is 1 (that is, the characters have not been displayed on the real image displayed on the display panel 9b), the routine of processing skips over Steps S52 to S55 and jumps to Step S56, judging whether the predetermined time $t_2$ has passed or not since the characters were erased.

In the navigation apparatus according to Embodiment (6), character information such as a primary place name or a primary building name is displayed as the additional information on the real image (for example, a satellite photograph or an aerial photograph). Thus, a user can find the primary place or the primary building easily due to the additional information.

In addition, when there is an instruction to erase the additional information from the user, the additional information is erased from the real image for the predetermined time $t_2$. Accordingly, at user's desire, the additional information can be erased to make it easy to see the real image.

In addition, in the navigation apparatus according to Embodiments (1) to (6), description is made only about the case where character information such as place names or building names is displayed as the additional information. However, the additional information is not limited to the character information. For example, the additional information may include a land mark such as a building.

Next, description will be made about navigation apparatus according to Embodiment (7). The navigation apparatus according to Embodiment (7) has the same configuration as the navigation apparatus shown in FIG. 1, except the microcomputer 1. Thus, the microcomputer in the navigation apparatus according to Embodiment (7) is denoted by the different reference numeral, but description of the other constituent members will be omitted here.

Figure 11:
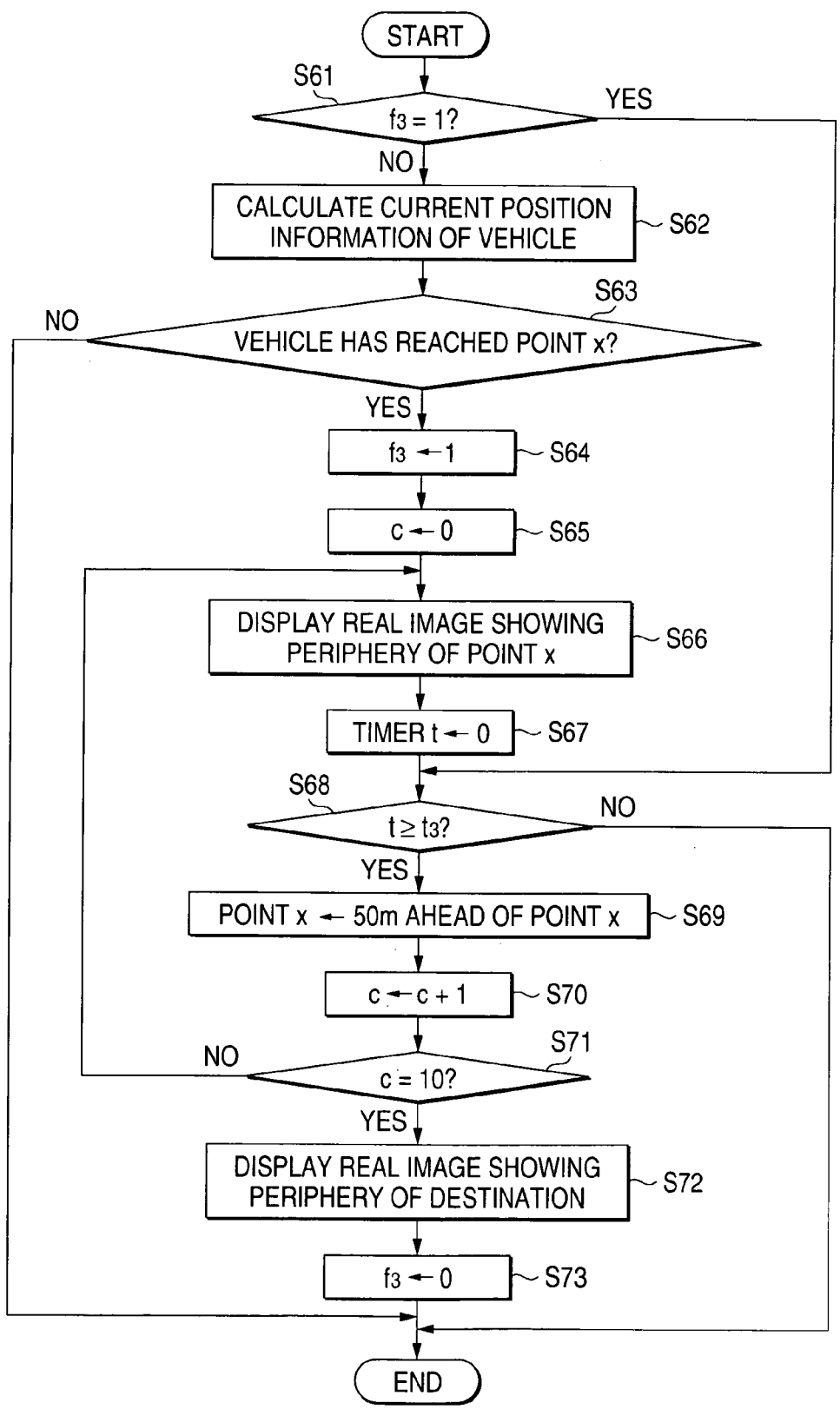
FIG. 11 is a flow chart showing a processing operation performed by a microcomputer in navigation apparatus according to Embodiment (7) of the invention.

A processing operation (7) performed by a microcomputer 1F in the navigation apparatus according to Embodiment (7) will be described with reference to the flow chart shown in FIG. 11. Incidentally, the processing operation (7) is to be performed when the vehicle is running for a destination along a predetermined navigation route.

Figure 12:
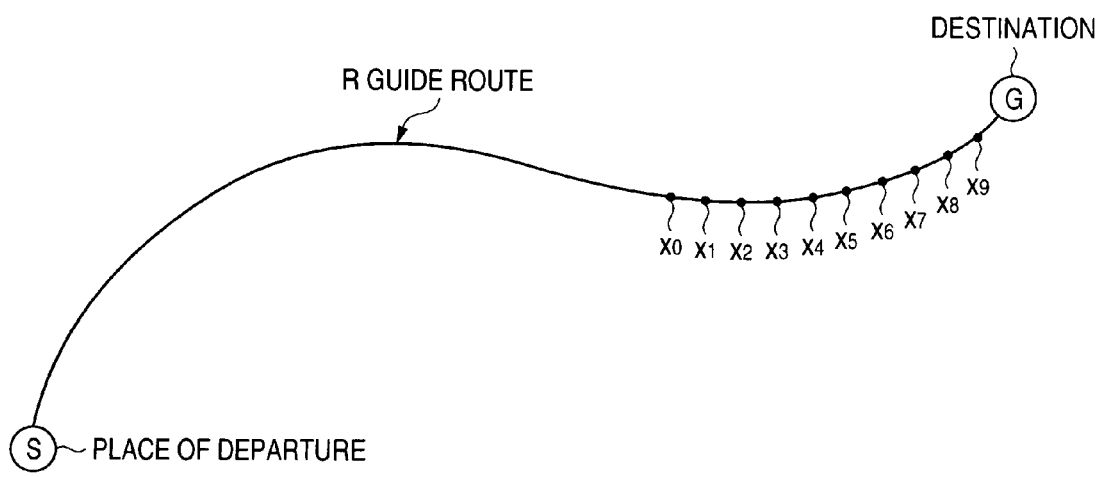
FIG. 12 is a schematic view showing an example of a navigation route for a destination.

FIG. 12 is a schematic view showing an example of a navigation route R, in which a point S designates the place of departure, a point G designates the destination, a point $x_o$ designates a point 500 m short of the destination G, and a point $x_i$ (i=1, 2, . . . , 9) designates a point 50 m closer to the destination G than a point $x_j$ (j=i−1)

First, it is judged whether a flag $f_3$ indicating that simulation display to reach the destination G along the navigation route R has been performed is 1 or not (Step S61). When it is concluded that the flag $f_3$ is not 1 (that is, the simulation display has not been performed), next the current position of the vehicle is calculated from the GPS signal or the like (Step S62). Whether the vehicle has reached a point x (for example, the point $x_o$ where a covered distance of 500 m is left to reach the destination) or not is judged on the basis of the calculated current position information of the vehicle and the predetermined route information about the navigation route R for the destination G (Step S63).

When it is concluded that the vehicle has reached the point x (point $x_o$), the flag $f_3$ is set at 1 (Step S64), while a counter c is set at 0 (Step S65). After that, a real image (for example, a satellite photograph or an aerial photograph) showing the periphery of the point x is displayed on the display panel 9b on the basis of the position information indicating the point x and the real image data stored in the RAM 1a (Step S66). Next, a timer t is reset and started (Step S67), and the routine of processing advances to Step S68. On the other hand, when it is concluded that the vehicle has not been reached the point x (point $x_o$), the processing operation (7) is terminated as it is.

In Step S68, it is judged whether the timer t has counted at least a predetermined time $t_3$ (for example, 2 seconds) or not. When it is concluded that the timer t has counted at least the predetermined time $t_3$ (that is, 2 seconds have passed since the real image showing the periphery of the point x was displayed), next the point x is updated to a point 50 m ahead of the current point along the navigation route R on the basis of the navigation information (for example, if the point x is the point $x_o$ before the update, the point x will be updated to the point $x_1$, and if the point x is the point $x_9$ before the update, the point x will be updated to the destination G) (Step S69). At the same time, 1 is added to the counter c (Step S70), and the routine of processing then advances to Step S71. On the other hand, when it is concluded that the timer t has not counted the predetermined time $t_3$, the processing operation (7) is terminated as it is.

In Step 71, it is judged whether the counter c has counted a predetermined number of times $c_1$ (for example, 10=500 m/50 m) or not. When it is concluded that the counter c has counted the predetermined number of times $c_1$ (that is, the updated point x has reached the destination G), next a real image showing the periphery of the destination G is displayed on the display panel 9b on the basis of the position information indicating the destination G and the real image data stored in the RAM 1a (Step S72). After that, the flag $f_3$ is set at 0 (Step S73). On the other hand, when it is concluded that the counter c has not counted the predetermined number of times $c_1$, the routine of processing returns to Step S66, displaying a real image showing the periphery of the updated point x on the display panel 9b.

On the other hand, when it is concluded in Step S61 that the flag $f_3$ is 1 (that is, the simulation display has been performed), the routine of processing skips over Steps S62 to S67 and jumps to Step S68.

In the navigation apparatus according to Embodiment (7), when the vehicle reaches the point $x_o$ (for example, the point 500 m short of the destination G), first, a real image showing the periphery of the point $x_o$ is displayed on the display panel 9b. After 2 seconds, the image to be displayed on the display panel 9b is switched to a real image showing the periphery of the point $x_1$ (the point 50 m closer to the destination G than the point $x_o$) Finally, a real image showing the periphery of the destination G is displayed on the display panel 9b.

That is, the real images showing the peripheries of the points on the navigation route R (a total of 11 points including the points $x_o$–$x_9$ and the destination G) are displayed in simulation on the display panel 9b along the navigation route R from the point $x_o$ to the destination G. Thus, the traveling environment from the point $x_o$ to the destination G can be introduced to the user. Accordingly, the user can grasp the conditions near the destination G or the like in advance from the real images such as satellite photographs.

In addition, in the navigation apparatus according to Embodiment (7), the point $x_o$ where the simulation display is started is established on the basis of the covered distance (here, 500 m) required for reaching the destination G. However, in navigation apparatus according to another embodiment, the point $x_o$ may be set on the basis of the estimated traveling time to reach the destination G or the beeline distance to the destination G. In addition, the point $x_o$ may be set desirably by the user, or the running speed of the vehicle or the regulation speed on the navigation route may be taken into consideration.

In addition, in the navigation apparatus according to Embodiment (7), the simulation display is started when the vehicle reaches the point $x_o$. However, the timing with which the simulation display is started is not limited thereto. For example, the timing may be instructed by the user.

In the above described embodiments, the terms "neighborhood", "periphery", and "near" are used. The term "near" indicates a narrower area than the term "periphery". The term "near" also indicates the same area as the term "neighborhood". However, the term "near" may indicate a narrower area than the term "neighborhood" or may indicate a wider area than the term "neighborhood".

What is claimed is:

1. A navigation apparatus, comprising:
    a display screen;
    a first display control unit which makes the display screen display a real image, based on real image data formed to be able to associate with positional coordinates and which determines a limited display area including a current position of the navigational apparatus that is less than the real image based on the current position of the navigation apparatus; and
    a second display control unit which displays additional information over the real image displayed on the display screen, based on additional information data corresponding to character information and position data indicating a position where the additional information should be displayed,
    wherein the second display control unit displays the additional information within an area on the real image displayed on the display screen other than the limited display area.

2. The navigation apparatus according to claim 1, wherein when the first display control unit displays the real image showing a periphery of a current position of the navigation apparatus on the display screen based on position information indicating the current position of the navigation apparatus, the limited display area does not include a neighborhood of the current position of the navigation apparatus.

3. A navigation apparatus, comprising:
    a display screen;
    a first display control unit which makes the display screen display a real image, based on real image data formed to be able to associate with positional coordinates; and
    a second display control unit which displays additional information on the real image display on the display screen, based on character information data corresponding to additional information and position data indicating a position where the additional information is to be displayed,
    wherein the second display unit, based on a category specified by a user and contained in the additional information and category data associated with the additional information, differentiates and displays only the specified category of the additional information from that of the other categories of the additional information.

4. The navigation apparatus according to claim 3, further comprising:
    a control unit that allows the user to specify the at least one category of the additional information from among the plural categories of the additional information.

5. A navigation apparatus, comprising:
    a display screen;
    a first display control unit which makes the display screen display a real image, based on real image data formed to be able to associate with positional coordinates; and
    a second display control unit which displays additional information on the real image display on the display screen, based on additional information data corresponding to character information and position data indicating a position where the additional information is to be displayed,
    wherein the second display control unit selects a display form of the additional information based on a condition that the real image is displayed at or near the position where the additional information should be displayed, and displaying the additional information on the real image in the selected display form.

6. The navigation apparatus according to claim 5, wherein the condition that the real image is displayed is a color tone of the real image and the additional information is displayed in a color tone different from the color tone of the real image to be made conspicuous.

7. A navigation apparatus, comprising:
    a display screen;
    a first display control unit which makes the display screen display a real image, based on real image data formed to be able to associate with positional coordinates; and
    a second display control unit which displays additional information on the real image display on the display screen, based on character information data corresponding to the additional information and position data indicating a position where the additional information is to be displayed,
    wherein the second display control unit selects a display form of the additional information based on category data associated with the additional information, and displays the additional information on the real image in the selected display form.

8. A navigation apparatus, comprising:
    a display screen;
    a first display control unit which makes the display screen display a real image, based on real image data formed to be able to associate with positional coordinates;
    a second display control unit which displays additional information including character information on the real image display on the display screen, based on additional information data corresponding to additional information and position data indicating a position where the additional information is to be displayed;

a change specifying unit which allows a user to specify a change of a display form of the additional information to be displayed on the real image;

a change content storing unit which stores a content of the change of the display form; and a storage control unit which makes the change content storing unit store the content of the change of the display form specified by the change specifying unit;

wherein the second display control unit selects the display form of the additional information based on the content stored in the change content storing unit, and displays the additional information on the real image in the selected display form.

9. The navigation apparatus according to claim 8, wherein the change specifying unit allows the user to specify at least one of the position where the additional information should be displayed, a condition that the real image is displayed in or near the position where the additional information should be displayed, and a category associated with the additional information, as the change of the display form of the additional information.

10. A navigation apparatus comprising:

a display screen;

a first display control unit which makes the display screen display a real image, based on real image data formed to be able to associate with positional coordinates; and a second display control unit which displays additional information on the real image display on the display screen, based on additional information data corresponding to additional information and position data indicating a position where the additional information is to be displayed, wherein when the second display control unit determines that an instruction to display the additional information has been given by a user, the second display control unit displays the additional information on the real image for a predetermined period.

11. A navigation apparatus comprising:

a display screen;

a first display control unit which makes the display screen display a real image, based on real image data formed to be able to associate with positional coordinates; and a second display control unit which displays additional information on the real image display on the display screen, based on additional information data corresponding to additional information and position data indicating a position where the additional information is to be displayed, wherein when the additional information is displayed on the real image and the second display control unit determines that an instruction to erase the additional information has been given by a user, the second display control unit erases the additional information from the real image for a predetermined period.

12. A navigation apparatus, comprising:

a display screen which displays information required for reaching a destination to guide the navigation apparatus to the destination; and a display control unit which displays on the display screen real images showing peripheries of points on a guide route subsequently at predetermined time intervals, from a second point to a first point along the guide route on the basis of route information and real image data, wherein:

the route information relates to the guide route for the navigation apparatus to reach a first point;

the real image data is formed to associate with positional coordinates; and the navigation apparatus will pass through the second point before reaching the first point.

* * * * *